United States Patent [19]
Lee et al.

[11] Patent Number: 5,651,950
[45] Date of Patent: Jul. 29, 1997

[54] PROCESS FOR PRODUCING SILICON CARBIDE

[75] Inventors: Yuan-Haun Lee; Yu-Shiang Wu, both of Taipei, Taiwan

[73] Assignee: Yee Fong Chemical & Ind. Co., Ltd., Taipei, Taiwan

[21] Appl. No.: 504,165

[22] Filed: Jul. 19, 1995

[51] Int. Cl.$^6$ .................................................. C01B 31/36
[52] U.S. Cl. ............................................. 423/345; 423/345
[58] Field of Search ................................................ 423/345

[56] References Cited

U.S. PATENT DOCUMENTS

| | | | |
|---|---|---|---|
| 4,410,502 | 10/1983 | Yamaguchi et al. | 423/345 |
| 4,500,504 | 2/1985 | Yamamoto | 423/345 |
| 4,963,286 | 10/1990 | Coyle et al. | 423/345 |

*Primary Examiner*—Wayne Langel
*Attorney, Agent, or Firm*—Townsend and Townsend and Crew LLP

[57] ABSTRACT

Disclosed is a process for producing silicon carbide. The process includes the steps of (1) mixing β-resin extracted from coal-tar pitch with α-resin and silica gel; (2) after being dried, grinding the mixture to powder; (3) heating the powder in an atmosphere of nitrogen with a temperature in the range from 300° C. to 480° C. until mesophase is cultured; and (4) proceeding the heat treatment with a higher temperature in the range from 900° C. to 1200° C. for a period in the range from 2 to 7 hours. By the process, the production of silicon carbide can be carried out at low temperatures so that it is cost-effective in energy consumption.

5 Claims, 9 Drawing Sheets
(5 of 9 Drawing(s) in Color)

FLOW DIAGRAM OF THE PROCESS FOR PRODUCING SILICON CARBIDE

FIG. 1  FLOW DIAGRAM OF THE PROCESS FOR EXTRACTING COAL-TAR PITCH

FIG. 2 FLOW DIAGRAM OF THE PROCESS FOR PRODUCING SILICON CARBIDE (a) Raman spectra of puried β-SiC (b) heat-treated of a mixture of β-resin with 5% α-resin and 20% silica gel at 1000°C for 3 hours.

(c) a mixture of coat-tar pitch and 20% silica gel.

(a) the X-ray diffraction pattern of puried β-SiC (b) heat-treated of a mixture of β-resin with 5% α-resin and 20% silica gel at 1000 °C for 3 hours.

(c) a mixture of coal-tar pitch and 20% silica gel

PROCESS FOR PRODUCING SILICON CARBIDE

BACKGROUND OF THE INVENTION

1. Field of the Invention

The present invention relates to a process for making silicon carbide. Particularly, the process according to the present invention can be used to make silicon carbide of high purity by low-temperature heat treatment so that energy is significantly saved.

2. Description of Prior Art

Silicon carbide possesses many excellent qualities as high rigidity, wear-resistance, erosion-resistance and is chemically stable. Therefore, it has been widely used as refractory material in the industry and also as a primary material in the making of cutting and grinding tools.

In the present day, a conventional process for mass-production of silicon carbide is the Acheson method which is carried out in solid phase. In the process, a mixture of char and silicon dioxide is placed in batch into an oven and then heated therein with a temperature of 2000° C. After a long time of reaction, α-type silicon carbide in lumps can be produced. The chemical equation of the reaction is as follows:

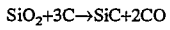

$$SiO_2 + 3C \rightarrow SiC + 2CO$$

It is a drawback of the foregoing process that about 8,000 KWH of electrical power is needed to produce a ton of coarse blank of silicon carbide. Energy consumption is therefore very great.

The process for production of β-type silicon carbide uses a powder of high-purity silicon dioxide and metal mixed with a powder of char and then heats the mixture in a protective atmosphere with a temperature in the range 1500° C.–1800° C. The chemical equation for the reaction is as follows:

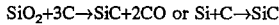

$$SiO_2 + 3C \rightarrow SiC + 2CO \text{ or } Si + C \rightarrow SiC$$

Besides the solid state reaction, the production of β-type silicon carbide can also be carried out by gas phase synthesis in which the reactants are oxidized under high temperatures to form the product.

All of the foregoing processes require great amounts of energy to perform. There exists therefore a process that can be used to produce silicon carbide with low energy consumption.

It has been found that in the reaction of $SiO_2 + 3C \rightarrow SiC + 2CO$, $SiO_2$ is not only used as the material for the carbonization stage, but also as a silicon source. Through research effort for the present invention, it is found that the reduction capability of the mesophase developed in the heat treatment from the coal-tar pitch is stronger due to the catalysis of the mesophase. The mesophase therefore has catalytic effect that accelerate the rate of reaction. In accordance with the present invention, large quantity of mesophase is used in substitute for conventional $SiO_2$ to be reacted with silica gel. With the catalytic activity of the mesophase, the mixture additivity and high-purity of the silica gel, silicon carbide can be produced by using lower industrial temperature that saves precious energy.

SUMMARY OF THE INVENTION

It is therefore a primary objective of the present invention to provide a silicon carbide production process which can be accomplished with less energy consumption.

In accordance with the foregoing and other objectives of the present invention, there is provided with a novel silicon carbide production process. The process includes the steps of (1) mixing β-resin extracted from coal-tar pitch with α-resin and silica gel; (2) after being dried, grinding the mixture to powder; (3) heating the powder in an atmosphere of nitrogen with a temperature in the range from 300° C. to 480° C. until a mesophase is cultured; and (4) proceeding the heat treatment with a higher temperature in the range from 900° C. to 1200° C. for a period time in the range from 2 to 7 hours. By the process according to the present invention, the production of silicon carbide can be carried out more cost effectively.

BRIEF DESCRIPTION OF DRAWINGS

The file of this patent contains at least one drawing executed in color. Copies of this patent with color drawings will be provided by the Patent and Trademark Office upon request and payment of the necessary fee.

The present invention can be more fully understood by reading the subsequent detailed description of the preferred embodiments thereof with references made to the accompanying drawings, wherein.

DETAILED DESCRIPTION OF PREFERRED EMBODIMENT

Figure 1:
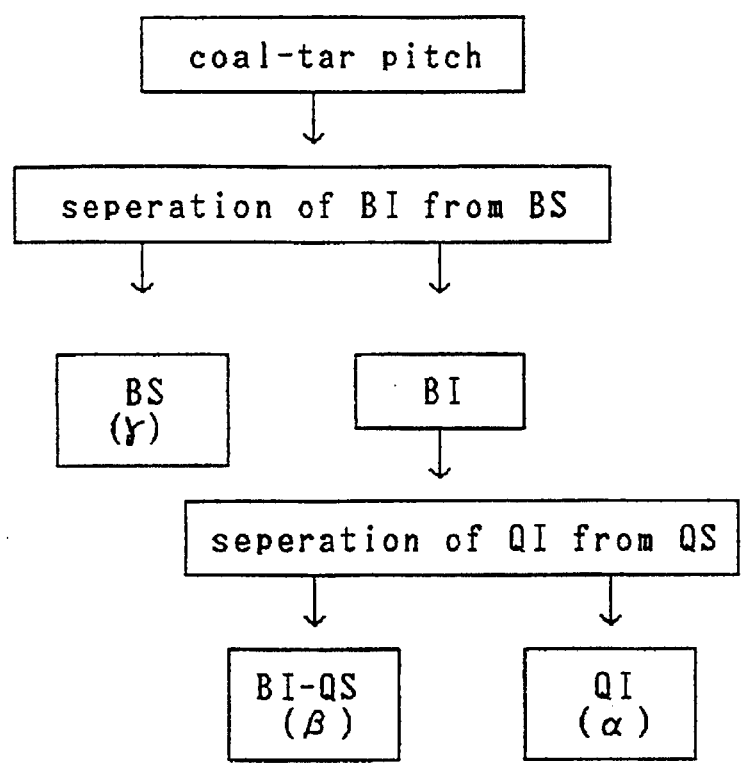
FIG. 1 is a flow diagram showing the process for extracting coal-tar pitch.
Figure 2:
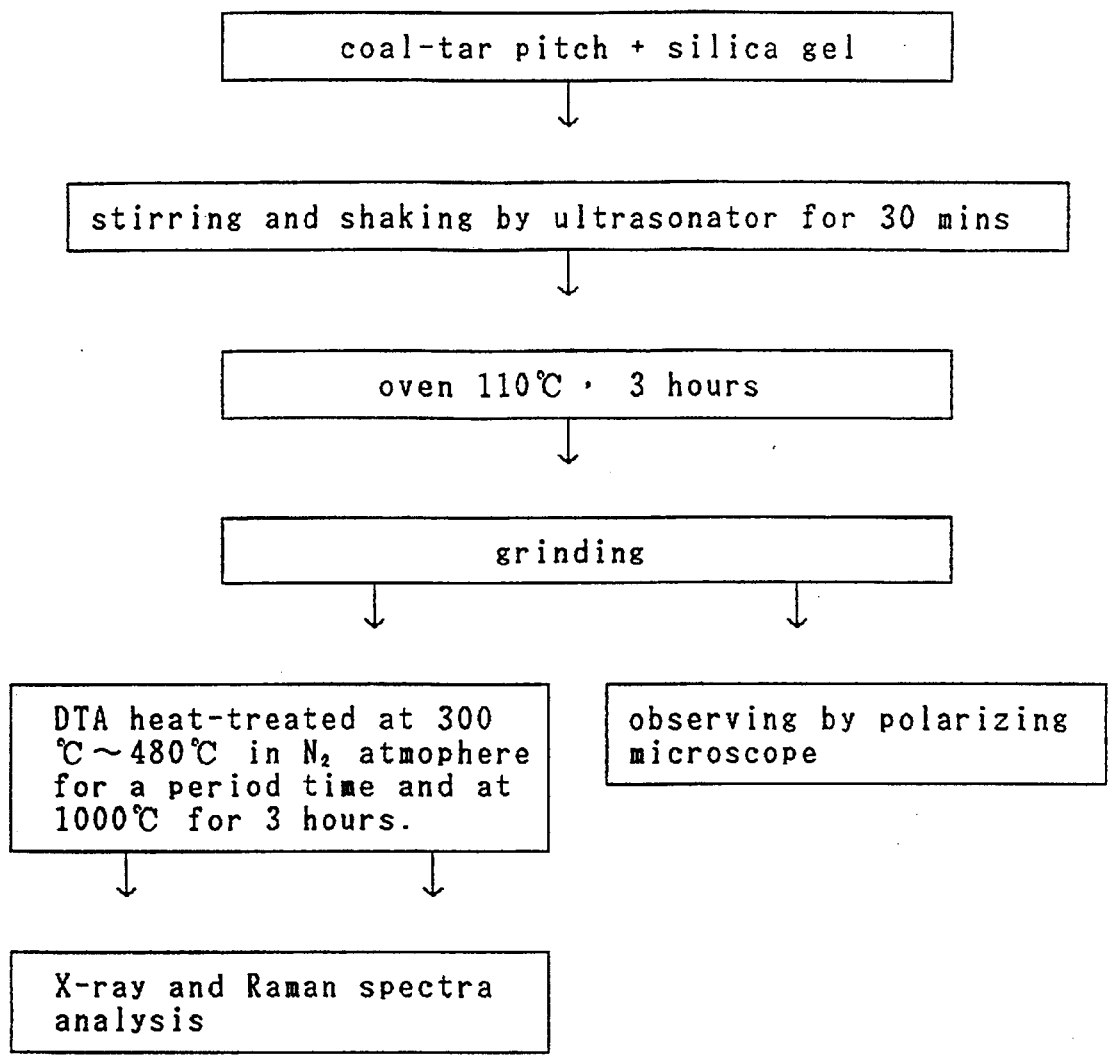
FIG. 2 is a flow diagram showing the process for producing silicon carbide.
Figure 3:
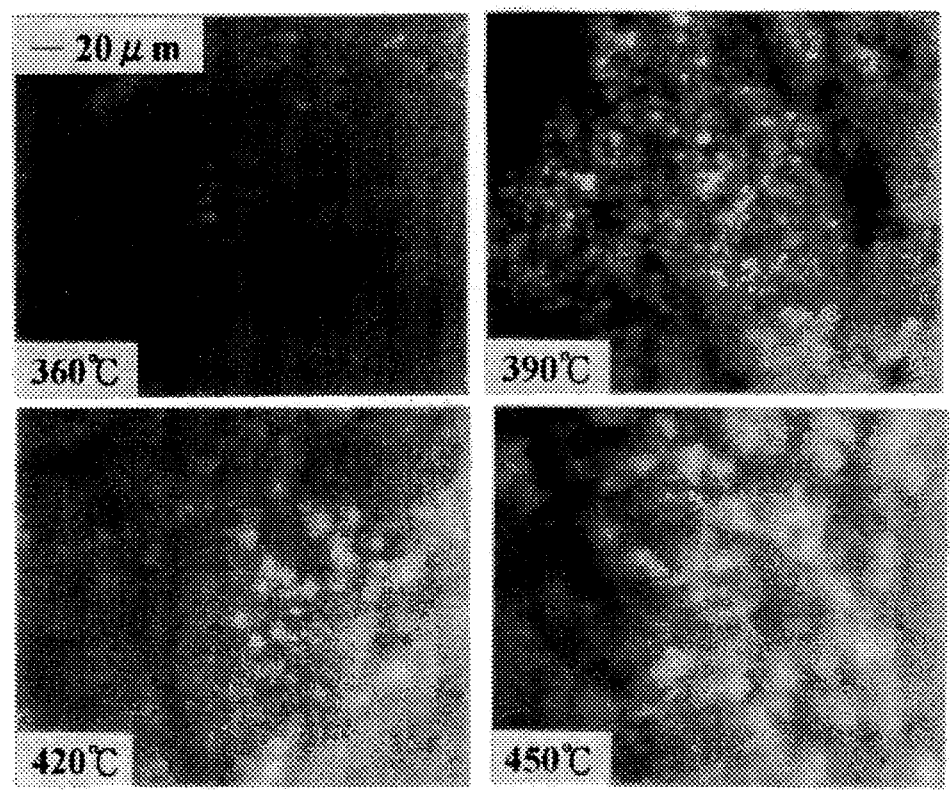
FIG. 3 shows the mesophase diagram for the coal-tar pitch under various temperatures.
Figure 4:
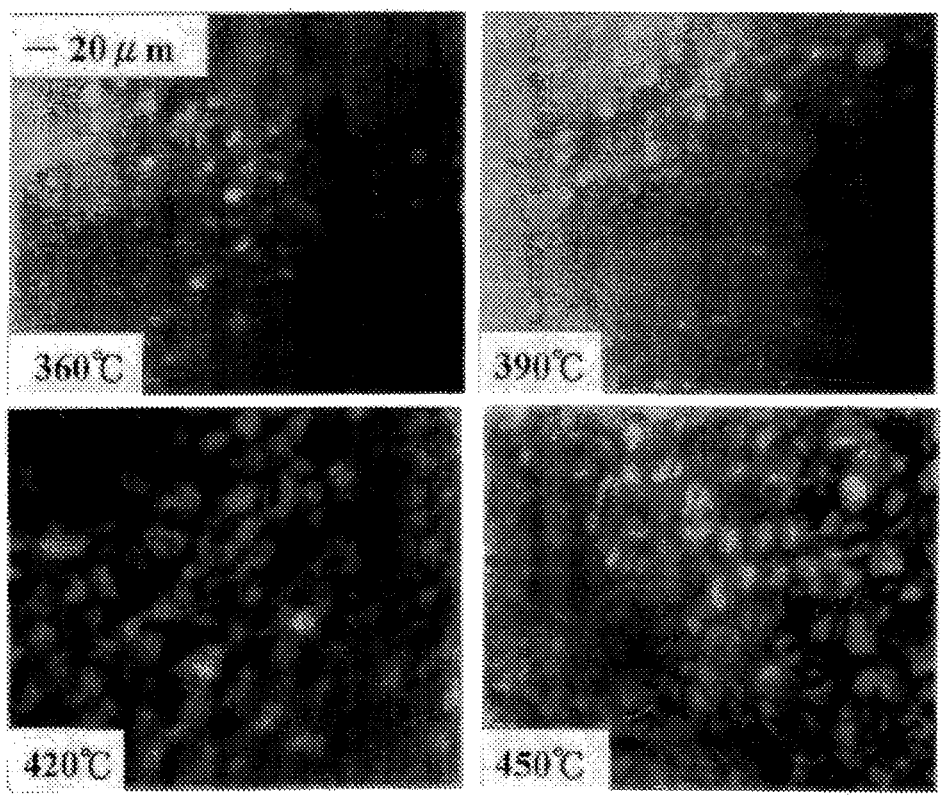
FIG. 4 shows the mesophase diagram for the β-resin under various temperatures.
Figure 5:
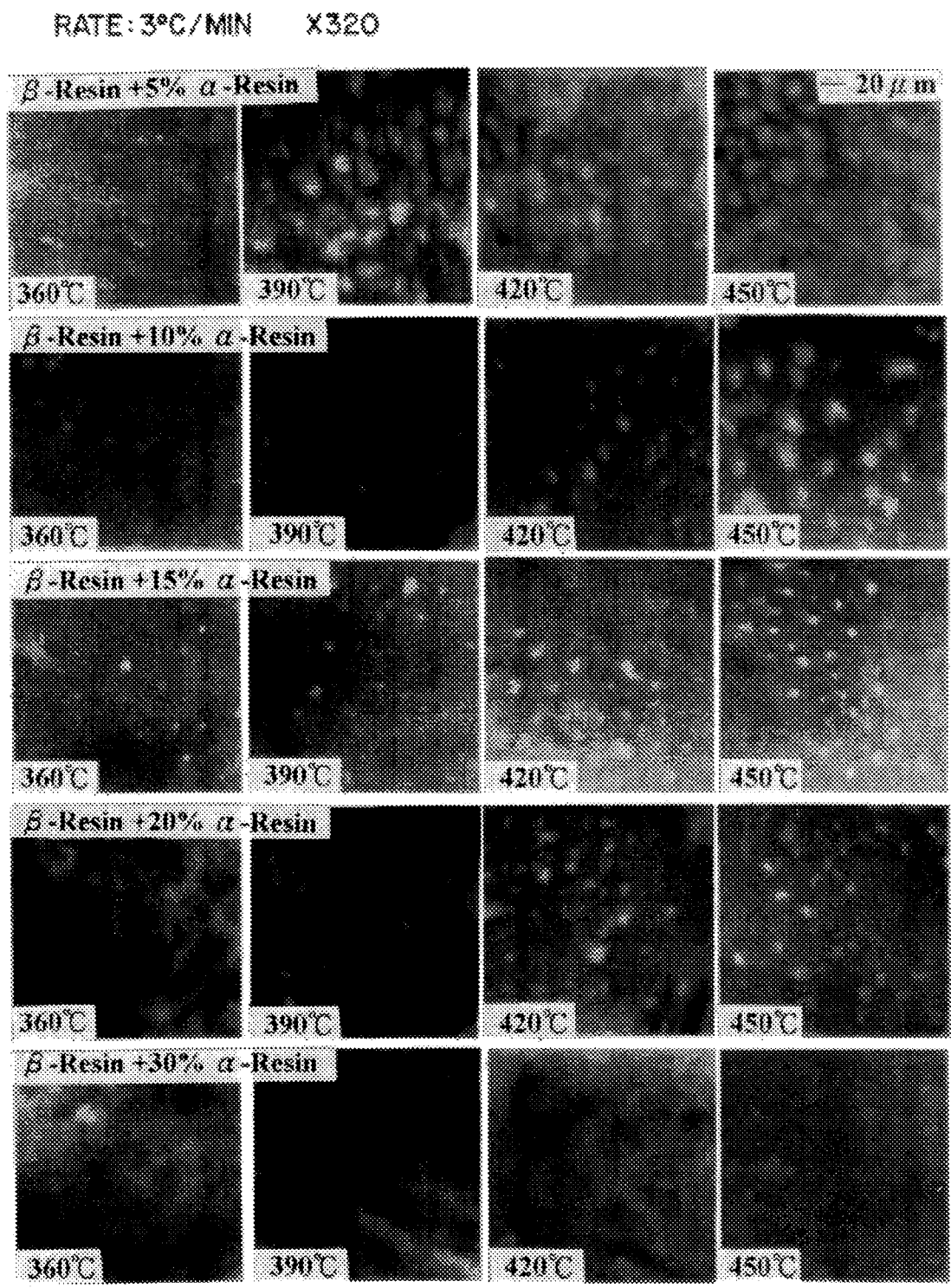
FIG. 5 shows the mesophase diagram for the β-resin mixed with α-resin of various ratios under various temperatures.
Figure 6:
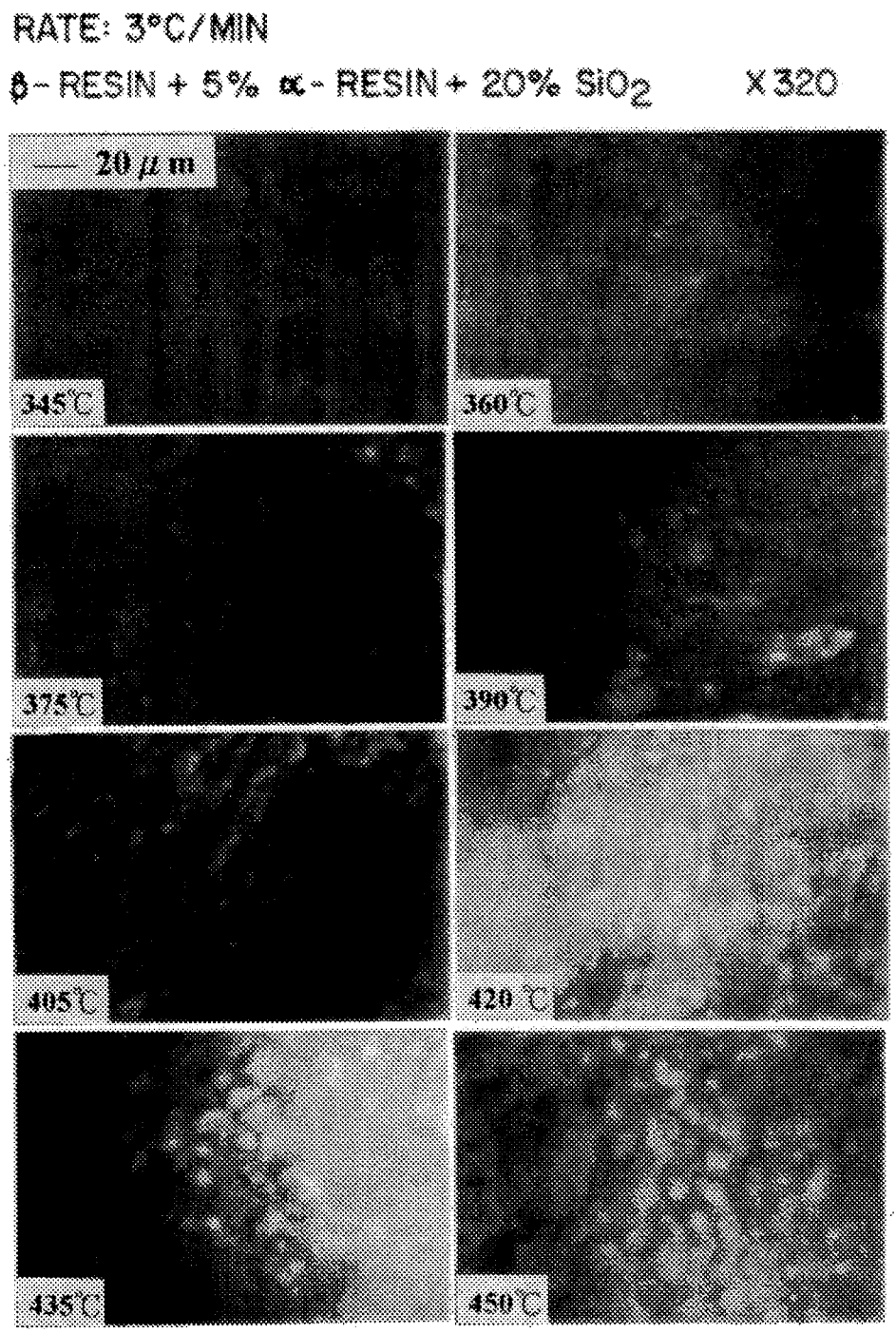
FIG. 6 shows the mesophase diagram for the β-resin mixed with 5% α-resin and 20% silica gel under various temperatures.
Figure 7:
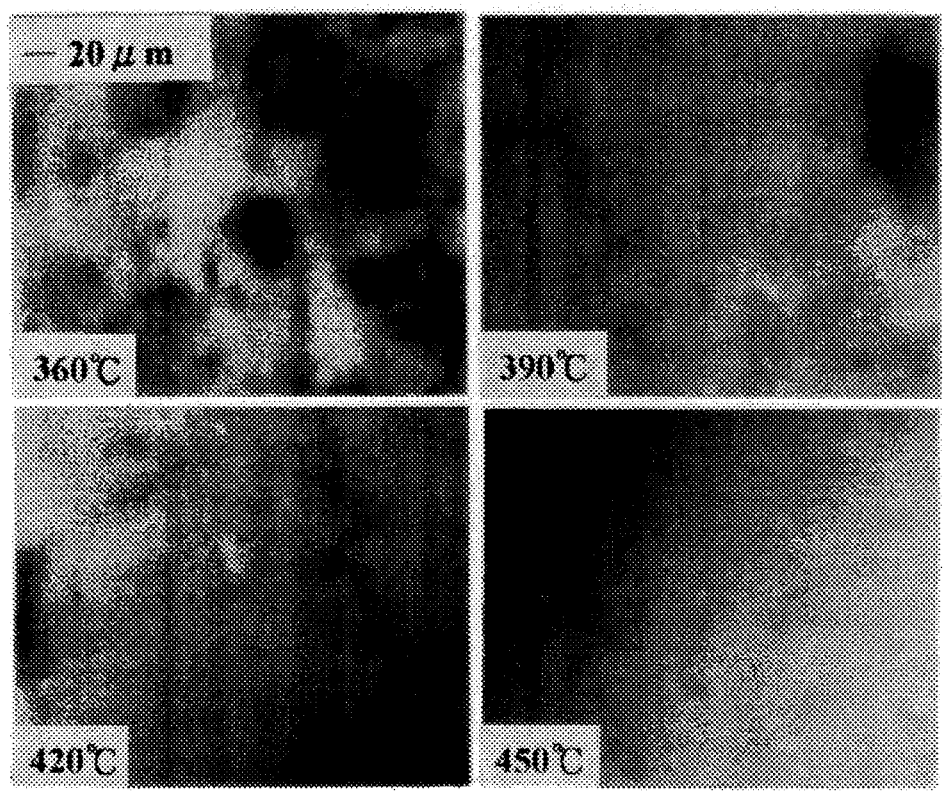
FIG. 7 shows the mesophase diagram for the coal-tar pitch mixed with 20% silical gel under various temperatures.

The mesophase of the coal-tar pitch is highly reactive so that it can be used as catalyst. The coal-tar pitch is an isotropic substance, but can be turned into optically anisotropic mesophase pellets in the mesophase. A polarizing microscope can be used to observe the changes in the reaction. Based on this effect, the research effort for the present invention was directed to finding conditions under which large quantity of mesophase be produced. Since the mesophase possesses catalytic effect, it can react with a mass of silica gel to produce silicon carbide.

In the process according to the present invention, coal-tar pitch is separated into α-resin, β-resin, and Γ-resin by using quinoline and benzene as solvents. β-resin is the primary substance that can produce the mesophase while α-resin and Γ-resin cannot. From the solution, Γ-resin is the benzene soluble (BS) which has a relatively low molecular weight below 300 Mn; β-resin is a mixture of the benzene insoluble and quinoline soluble (BI-QS) which has a molecular weight in the 300 Mn–2000 Mn range and contains aromatic compounds; and α-resin is the quinoline insoluble (QI) which has a high molecular weight of more than 2000 Mn. After extraction, the percentages by weight of α-resin, β-resin, and Γ-resin are respectively 9%, 31.5%, and 59.5%.

In order to find those conditions that can produce large quantity of mesophase, samples of coal-tar pitch, β-resin, and β-resin added with various ratios of α-resin are placed in an atmosphere of nitrogen and then heated with various temperatures respectively at 360° C., 390° C., 420° C., and 450° C. raising with a rate of 3° C./min. A polarizing microscope on high-temperature platform is used to dynamically observe and track the changes in the growth of the mesophase. It can be seen from the accompanying mesophase diagrams that the area of the mesophase increases as the temperature raises.

For the coal-tar pitch sample, it is observed that at temperatures in the 390° C.–420° C. range, the area of mesophase is not significant, but merging of the minuscule pellets is observed; at 450° C., the merging is further expanded and the whole mesophase has a tendency of becoming fiberized.

For the β-resin sample, it is observed that at 360° C., the mesophase is more obvious than that of the coal-tar pitch sample; and at 420° C., merging appears and the area of the whole of mesophase is larger than that produced in the coal-tar pitch sample, but sizes of the minuscule pellets are not consistent.

For the sample of β-resin added with 5% of α-resin, the improvement on the formation of the mesophase is obviously significant. The area of the mesophase pellets is larger and the sizes of the pellets are more consistent and uniform. At 420° C.–450° C., pellets appear in individual manner and merging of the pellets is less seen. If the ratio of β-resin is increased to 10%, the mesophase pellets are restrained in number and size, but keep growing in individual manner. Increasing the content of β-resin, the mesophase is decreased, and almost extinct at a content ratio of 30% and below 450° C. From observations through the polarizing microscope, it is found that in order to achieve the optimal mesophase, the ratio of adding α-resin to β-resin is preferably no more than 10%, and most preferably 5%, and the heat treatment is carried out with a temperature in the range from 300° C. to 480° C.

Two samples are further prepared, the first sample being β-resin mixed with 5% of α-resin and 20% of silica gel, and the second sample being coal-tar pitch mixed with 20% of silica gel. The two samples are heat-treated with temperatures rising with a rate of 3° C./min to the range 345° C.–450° C. It is observed that in the first sample the growth of the mesophase is obvious and rapid at temperatures above 405° C.; mesophase grow in significant rates to large numbers in very short while. By contrast, in the second sample, no growth of mesophase developed.

In the process according to the present invention for producing silicon carbide, the first step involved therefore is to form a mixture of β-resin extracted from coal-tar pitch mixed with α-resin and silica gel. Ultrasonic vibrator is used to make the mixture evenly mixed. After that the mixture is placed in an oven to be heated to dryness with a temperature of about 100° C.–120° C. for 3–5 hours. After being dried, the mixture is ground to powder. The powdered mixture is then placed in an atmosphere of nitrogen and heated with temperatures raising at a rate of 3° C./min to within the 300° C.–480° C. range. The final temperature is maintained for 8–16 hours to culture the mesophase. After that, the temperature is again raised with a rate of 10° C./min to the 900° C.–1200° C. range to obtain powders of silicon carbide.

Raman spectroscopy is used for analysis of the silicon carbide product thus obtained using the process according to the present invention. It is observed that the product, as pure β-silicon-carbide, exhibits peak shifts at 2187 $cm^{-1}$, 3166 $cm^{-1}$, and 3228 $cm^{-1}$. Under the same conditions, the silicon carbide obtained from a mixture of raw coal-tar pitch and silica gel exhibits weaker peak intensities in the Raman spectrography. This difference indicates that the silicon carbide obtained through the process according to the present invention has a higher degree of purity. In addition, X-ray diffraction analysis shows the same result.

EXAMPLE 1

In this example, a lump of coal-tar pitch (produced by the Chinese Steel Company) having a carbon content of 91.3% and softening point of 103.8° C. is used. The coal-tar pitch lump ground to powder by using a grinding machine and then sieved to 230 mesh. 10 g of the coal-tar pitch powder is taken and added to a bottle of 30 ml benzene. The bottle is then placed on a beaker on a heater to be water heated to 70° C. A condenser tube is connected to the mouth of the bottle, allowing the benzene to circulate for 2 hours. After that, a filter is used to filter out the benzene insoluble from the solution. The filtered solution is then distilled at a temperature of 40° C. and a low pressure of 100 mmHg to obtain the benzene soluble which is the Γ-resin. The benzene insoluble is then added to a bottle of 20 ml quinoline and then the bottle is water heated at 70° C. for 2 hours. After that, a centrifugal apparatus is used to rapid deposit the quinoline insoluble and the suspension in the solution is poured into a filter to be filtered thereby. The filtered solution is then distilled at a temperature of 170° C. and a low pressure of 100 mmHg to obtain a mixture of the benzene insoluble and quinoline soluble which is the β-resin. The quinoline insoluble is the α-resin.

Figure 8:
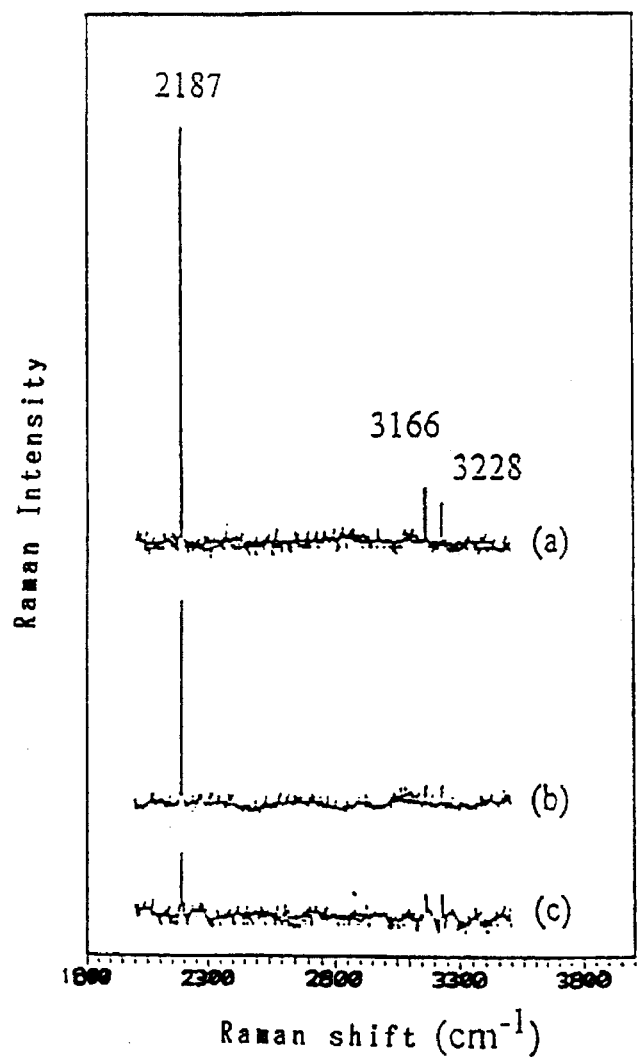
FIG. 8 shows the Raman spectra of the silicon carbide produced by the process according to the present invention.
Figure 9:
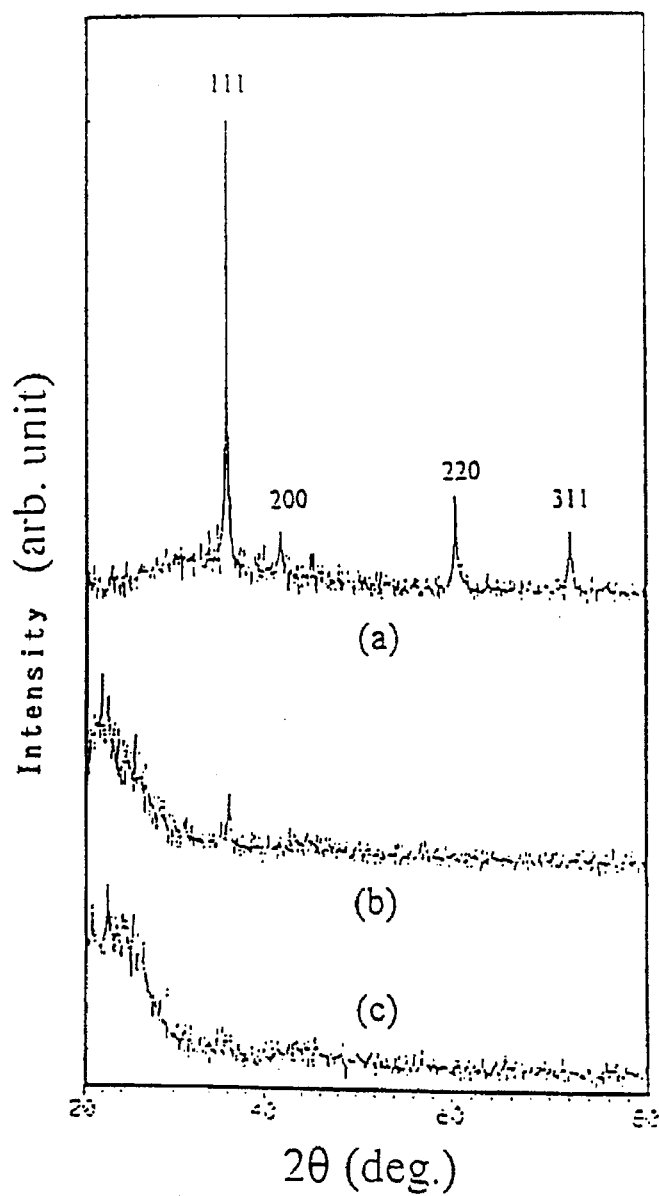
FIG. 9 shows the X-ray diffraction pattern of the silicon carbide produced by the process according to the present invention.

The β-resin is mixed with 5 wt % of α-resin and 20 wt % of silica gel (produced by the I-Fang Chemical Corporation of Taiwan, ROC and having a granule diameter of about 7–9 mm). The mixture is then placed in a 250 ml beaker to be stirred and subject to a 30-minute ultrasonic vibration treatment there to make the mixture more evenly mixed. After that, the mixture is placed in an oven to be baked there at a temperature of 110° C. for 3 hours. After being dried, the mixture is ground to powder and then the powdered mixture is placed in an atmosphere of nitrogen. In the nitrogen atmosphere, the temperature is gradually raised to 420° C. at a rate of 3° C./min. The final temperature of 420° C. is maintained for 12 hours and after that the temperature is gradually raised again to 1,000° C. at a rate of 10° C./min. The final temperature of 1,000° C. is maintained for 3 hours to obtain the final product. Raman spectroscopy and X-ray diffraction is used to analyze the final product and the results are shown in FIGS. 8 and 9, which indicate that the final product is silicon carbide of high-purity.

EXAMPLE 2

In this example, the steps of the process described in Example 1 are repeated, except that the content of α-resin is changed to 3 wt %. The final product is the same silicon carbide of high-purity.

EXAMPLE 3

In this example, the steps of the process described in Example 1 are repeated, except that the temperature in the final heat treatment is changed to 1,200° C. From spectra, it shows that the final product has the same degree of purity as the standard pure β-silicon-carbide.

Comparative Example 1

In this comparative example, the steps of the process described in Example 1 are repeated, except that coal-tar pitch is used in substitute for the mixture of β-resin and 5 wt % of α-resin. From Raman spectra, it shows that the degree of purity of the final product is lower than any of the final products obtained in the three examples according to the present invention.

The present invention has been described hitherto with exemplary preferred embodiments. However, it is to be understood that the scope of the present invention need not be limited to the disclosed preferred embodiments. On the contrary, it is intended to cover various modifications and similar arrangements within the scope defined in the following appended claims. The scope of the claims should be accorded the broadest interpretation so as to encompass all such modifications and similar arrangements.

What is claimed is:

1. A process for producing silicon carbide, comprising the following steps of:

(1) mixing β-resin extracted from coal-tar pitch with α-resin and silica gel to form a mixture;

(2) drying the mixture and grinding the dried mixture to powder;

(3) heating the powder in an atmosphere of nitrogen at a temperature in the range from 300° C. to 480° C. until a mesophase is cultured; and (4) heating the powder at a temperature in the range from 900° C. to 1200° C. for a period in the range from 2 to 7 hours.

2. A process as claimed in claim 1, wherein the percentage by weight of α-resin used in said Step (1) is 1 wt %–10 wt %.

3. A process as claimed in claim 2, wherein the percentage by weight of α-resin used in said Step (1) is 1 wt %–5 wt %.

4. A process as claimed in claim 1, wherein the culturing of the mesophase in said Step (3) is performed under a temperature in the range from 420° C. to 450° C.

5. A process as claimed in claim 1, wherein the heat treatment in said Step (4) is carried out with a temperature in the range from 1,000° C. to 1,200° C.

\* \* \* \* \*